(12) United States Patent
Cameron et al.

(10) Patent No.: US 9,548,602 B2
(45) Date of Patent: Jan. 17, 2017

(54) RUGGEDIZED ELECTRONIC ENCLOSURE FOR IN-GROUND INSTALLATION

(71) Applicant: Trimble Navigation Limited, Sunnyvale, CA (US)

(72) Inventors: John F. Cameron, Los Altos, CA (US); Larry Collins, Fairfield, IL (US); Daniel Shane Fitzgibbons, San Jose, CA (US)

(73) Assignee: Trimble Inc., Sunnyvale, CA (US)

( * ) Notice: Subject to any disclaimer, the term of this patent is extended or adjusted under 35 U.S.C. 154(b) by 785 days.

(21) Appl. No.: 13/691,358

(22) Filed: Nov. 30, 2012

(65) Prior Publication Data
US 2014/0152528 A1 Jun. 5, 2014

(51) Int. Cl.
| | | |
|---|---|---|
| *H01Q 1/04* | (2006.01) | |
| *H02G 9/10* | (2006.01) | |
| *H01Q 1/22* | (2006.01) | |
| *H01Q 3/02* | (2006.01) | |
| *H01Q 9/04* | (2006.01) | |

(52) U.S. Cl.
CPC ............... *H02G 9/10* (2013.01); *H01Q 1/04* (2013.01); *H01Q 1/2233* (2013.01); *H01Q 3/02* (2013.01); *H01Q 9/0407* (2013.01)

(58) Field of Classification Search
USPC .......... 343/749, 702, 700 MS, 719, 872, 870
See application file for complete search history.

(56) References Cited

U.S. PATENT DOCUMENTS

| | | | | |
|---|---|---|---|---|
| 5,298,894 A | * | 3/1994 | Cerny | G01D 4/006 324/74 |
| 6,300,907 B1 | * | 10/2001 | Lazar | H01Q 1/22 343/700 MS |
| 6,606,070 B2 | | 8/2003 | Olson et al. | |
| 6,683,570 B2 | | 1/2004 | Skladany et al. | |
| 7,319,429 B2 | * | 1/2008 | Chang | H01Q 15/0013 343/700 MS |
| 7,739,138 B2 | | 6/2010 | Chauhan et al. | |
| 2002/0180643 A1 | * | 12/2002 | Skladany | H01Q 1/32 343/700 MS |
| 2003/0085844 A1 | * | 5/2003 | Olson | H01Q 1/04 343/749 |

* cited by examiner

*Primary Examiner* — Hoang V Nguyen
*Assistant Examiner* — Hai Tran
(74) *Attorney, Agent, or Firm* — Kilpatrick Townsend & Stockton LLP

(57) ABSTRACT

A ruggedized electronic enclosure for in-ground installation is disclosed. In one embodiment, the ruggedized electronic enclosure comprises a top cover which is exposed above a top surface of the ground and a cylindrical base portion which is embedded within the ground. The top cover and the cylindrical base portion are configured to create a channel conveying an adhesive toward the center of the ruggedized enclosure when the top cover and the cylindrical base portion are coupled.

15 Claims, 7 Drawing Sheets

RUGGEDIZED ELECTRONIC ENCLOSURE FOR IN-GROUND INSTALLATION

BACKGROUND

In temperate climate zones, some utility meters are located in enclosures close to residences or other buildings. Utility companies use wireless technology to facilitate automatic collection of utility use data. For example, a wireless transceiver and antenna can be coupled with a meter and can be read using a remotely located reader device. As a result, the collection of billing data can be performed more quickly and reliably than when a person had to access the meter and manually record the billing data. One type of antenna used is called a "pit antenna" which is disposed within, or proximate to, a pit enclosure of a utility meter. Such pits are usually in the ground with the top of the housing enclosure exposed.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Figure 1A:
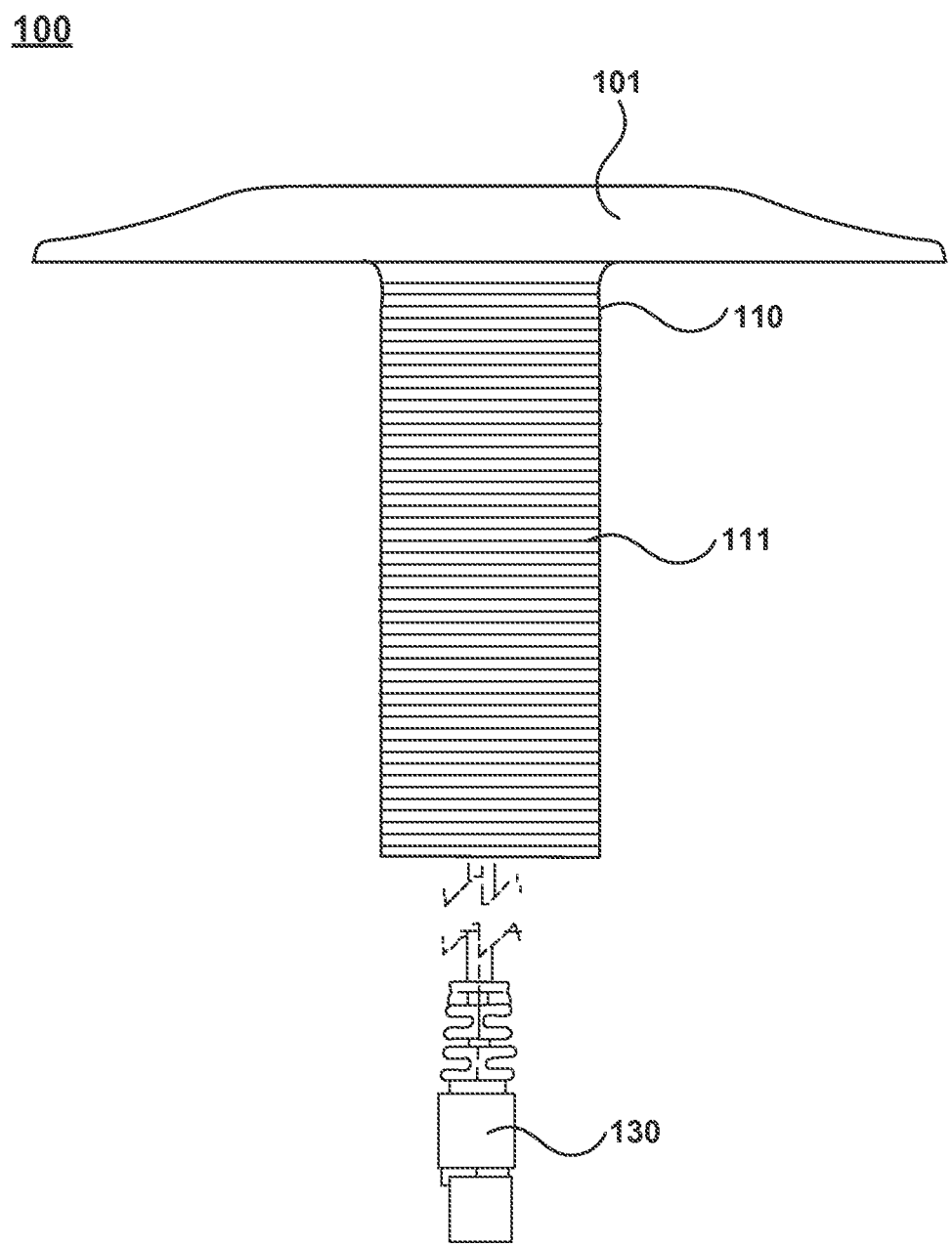
FIG. 1A is a side view of a ruggedized electronic enclosure for in-ground installation in accordance with one embodiment.

FIG. 1A is a side view of a ruggedized electronic enclosure 100 for in-ground installation in accordance with one embodiment. In the embodiment of FIG. 1A, ruggedized electronic enclosure 100 comprises a top cover 101 which is coupled with a base portion 110. In at least one embodiment, base portion 110 comprises a stem 111. In the embodiment shown in FIG. 1A, stem 111 is cylindrical and threaded on its exterior. In operation, stem 111 is inserted into a hole such as in the lid of a utility meter enclosure and a nut (not shown) is threaded onto stem 111 to secure ruggedized electronic enclosure 100 onto the lid of the utility meter enclosure. The nut threaded onto stem 111 can also be further secured using, for example, a jam nut to prevent the nut from loosening over time. Also shown in FIG. 1A is a cable assembly 130 which is used to communicatively couple electronic components disposed within ruggedized electronic enclosure 100 with other electronic components (not shown) disposed outside of ruggedized electronic enclosure 100. It is noted that while FIG. 1A shows a co-axial cable, various implementations of cable assembly 130 are not limited to co-axial cable alone. In one embodiment, cable assembly 130 communicatively couples an antenna (e.g., 114 of FIG. 2A) with a radio transceiver (not shown) which is disposed outside of ruggedized electronic enclosure 100. In another embodiment, cable assembly 130 communicatively couples a meter (not shown), or other electronic device, disposed outside of ruggedized electronic enclosure 100 with a radio transceiver (e.g., electronic component 135 of FIG. 2B) disposed within ruggedized electronic enclosure 100. In accordance with various embodiments, stem 111 can be sealed using, for example, a gasket (not shown) which prevents moisture, dirt, or other contaminants, from entering stem 111 from the bottom.

In the embodiment of FIG. 1A, top cover 101 has a flattened profile. As ruggedized electronic enclosure 100 is configured to be mounted at the ground level, stem 111 is situated below ground level, while top cover 101 is typically at or above the ground level. Top cover 101 is given a flattened profile to minimize its protrusion from the surface of the ground. As will be discussed in greater detail, top cover 101 is configured to withstand the application of weight or pressure on top. In accordance with various embodiments, top cover 101 and base portion 110 are made of a high-impact plastic material such as polycarbonate, urethane, etc. In one embodiment, top cover 101 and base portion 110 are made of a polyphenylene (PPO) ether resin and polystyrene such as the Noryl GFN1 resin which is commercially available from Sabic Innovative Plastics of Pittsfield Mass. In accordance with various embodiments, ruggedized electronic enclosure 100 is also configured so that force or pressure applied onto top cover 101 is at least in part distributed to base portion 110 as well. In another embodiment, top cover 101 is configured to reduce its deformation under a load. In operation, stem 111 is inserted into a hole such as in the lid of a utility meter enclosure and a nut (not shown) is threaded onto stem 111 to secure ruggedized electronic enclosure 100 onto the lid of the utility meter enclosure. The nut threaded onto stem 111 can also be further secured using, for example, a jam nut to prevent the nut from loosening over time.

Figure 1B:
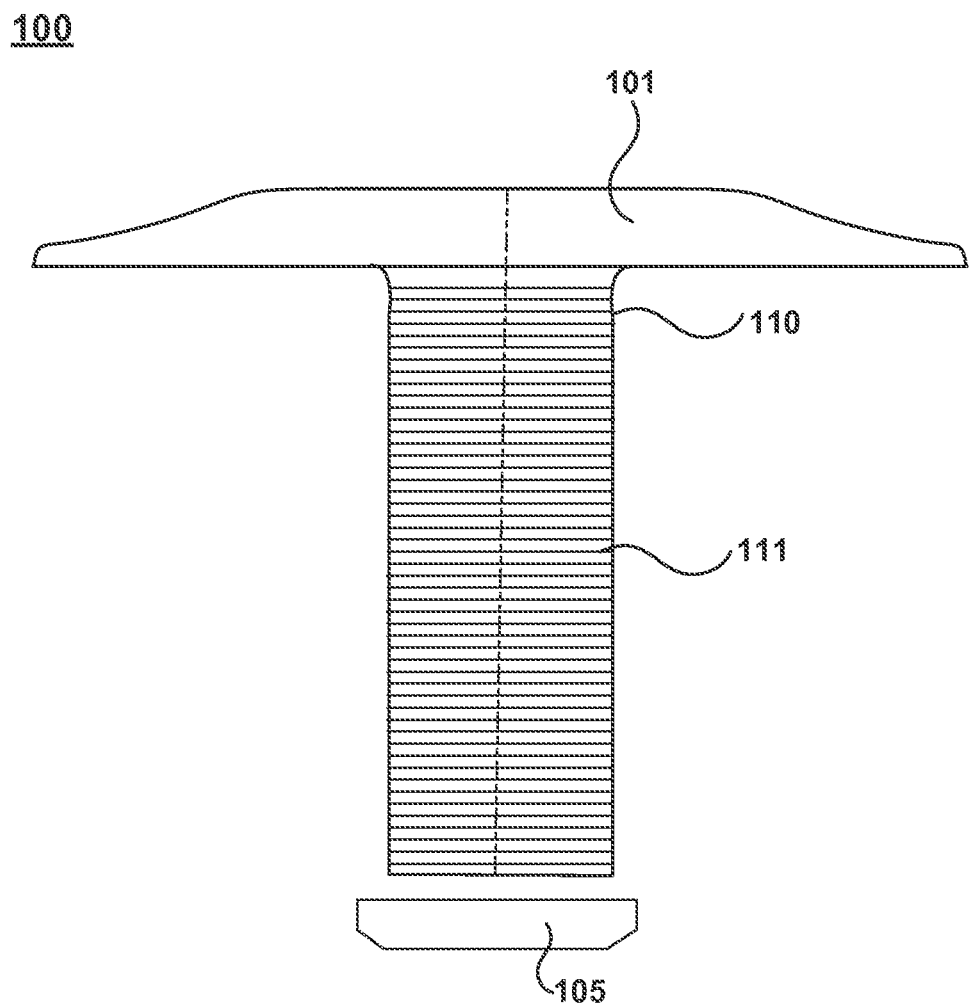
FIG. 1B is a side view of a ruggedized electronic enclosure for in-ground installation in accordance with one embodiment.

FIG. 1B is a side view of a ruggedized electronic enclosure 100 for in-ground installation in accordance with one embodiment. For the purpose of brevity, the features described above with reference to FIG. 1A will not be repeated in the discussion of FIG. 1B. In the embodiment of FIG. 1B, enclosure 100 further comprises a cap 105 which is configured to engage the threads on the outside of stem 111. In various embodiments, enclosure 100 comprises a self-contained unit comprising, but not limited to, a radio transceiver(s) (e.g., electronic component 135 of FIG. 2B) and antenna 114. In one embodiment, cap 105 can have an electrical connector embedded in one surface to facilitate coupling components disposed within enclosure 100 with components disposed outside of enclosure 100 without compromising the sealing integrity of enclosure 100. In other words, components disposed within ruggedized electronic enclosure 100 are coupled with one side of the embedded electrical connector disposed on the inner side of cap 105. Components disposed outside of ruggedized electronic enclosure 100 are then coupled with the other side of the embedded electrical connector disposed on the outer side of cap 105. Alternatively, cap 105 can be made of a material which is transparent to radio signals. Thus, the electronic component (e.g., 135 of FIG. 2B) disposed within stem 111 can be communicatively coupled with one transmitter proximate to enclosure 100 and relay a signal via antenna 114 to another network. In operation, stem 111 is inserted into a hole such as in the lid of a utility meter enclosure and a nut (not shown) is threaded onto stem 111 to secure ruggedized electronic enclosure 100 onto the lid of the utility meter enclosure. The nut threaded onto stem 111 can also be further secured using, for example, a jam nut to prevent the nut from loosening over time. Then, cap 105 is coupled with the threads on the outside of stem 111 to prevent moisture, dirt, or other contaminants from entering stem 111 from the bottom. In at least one embodiment, a gasket (not shown) may be disposed between cap 105 and some portion of stem 111 to further prevent moisture, dirt, or other contaminants from entering stem 111. In one embodiment, an adhesive can be disposed between stem 111 and cap 105 to more permanently join these components and to provide an additional seal against moisture, dirt, and other contaminants.

Figure 1C:
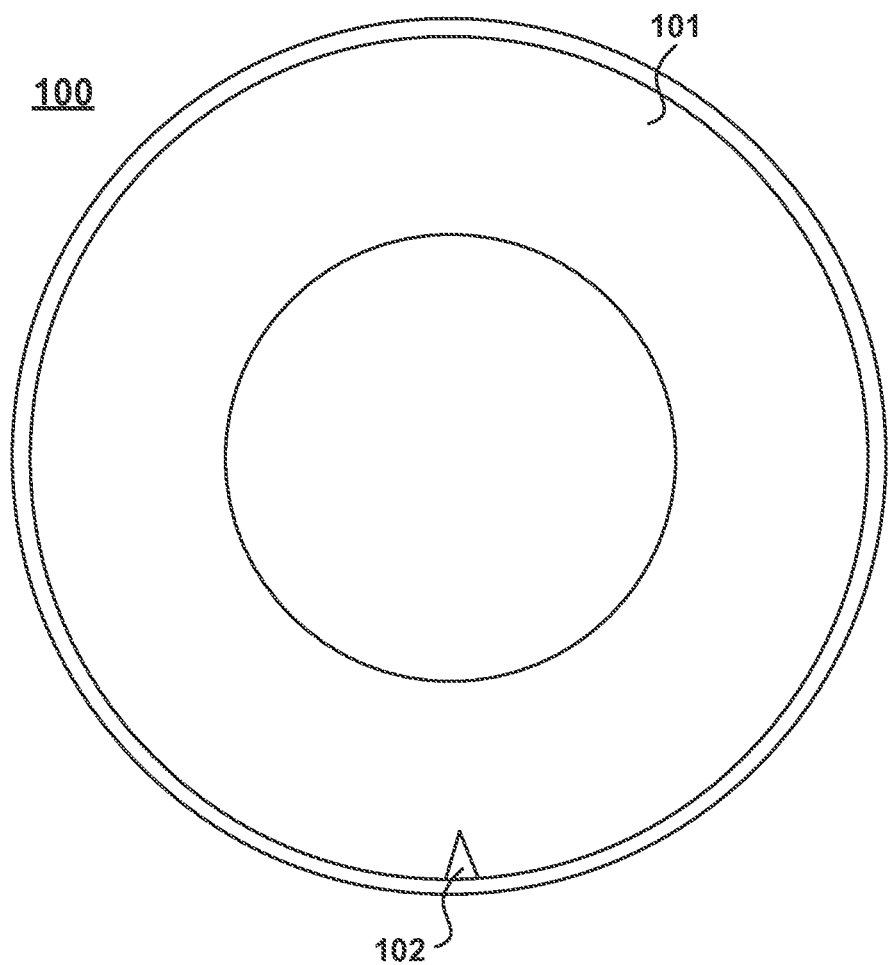
FIG. 1C is a top view of a ruggedized electronic enclosure for in-ground installation in accordance with an embodiment.

FIG. 1C is a top view of a ruggedized electronic enclosure 100 for in-ground installation in accordance with an embodiment. In FIG. 1C, a top cover 101 of a ruggedized electronic enclosure 100 is shown. In one embodiment, top cover 101 comprises an alignment indicator 102 is used to indicate the alignment of an antenna (e.g., the longitudinal axis of antenna 114 of FIG. 2A). As will be discussed in greater detail below, elements of ruggedized electronic enclosure 100 can be assembled such that the orientation of components such as antenna 114 are known to a user when ruggedized electronic enclosure 100 is fully assembled. This facilitates the user orienting ruggedized electronic enclosure 100 to direct transmission pattern lobes of antenna 114 in a desired direction. It is noted that in various embodiments, antenna 114 comprises vertically polarized omni-directional antenna. However, there can be small variations in the transmission pattern lobes of omni-direction antennas. Thus, by using alignment indicator 102, a user can align the pattern of the transmission lobes of ruggedized electronic enclosure 100 by twisting it in a desired direction.

Figure 2A:
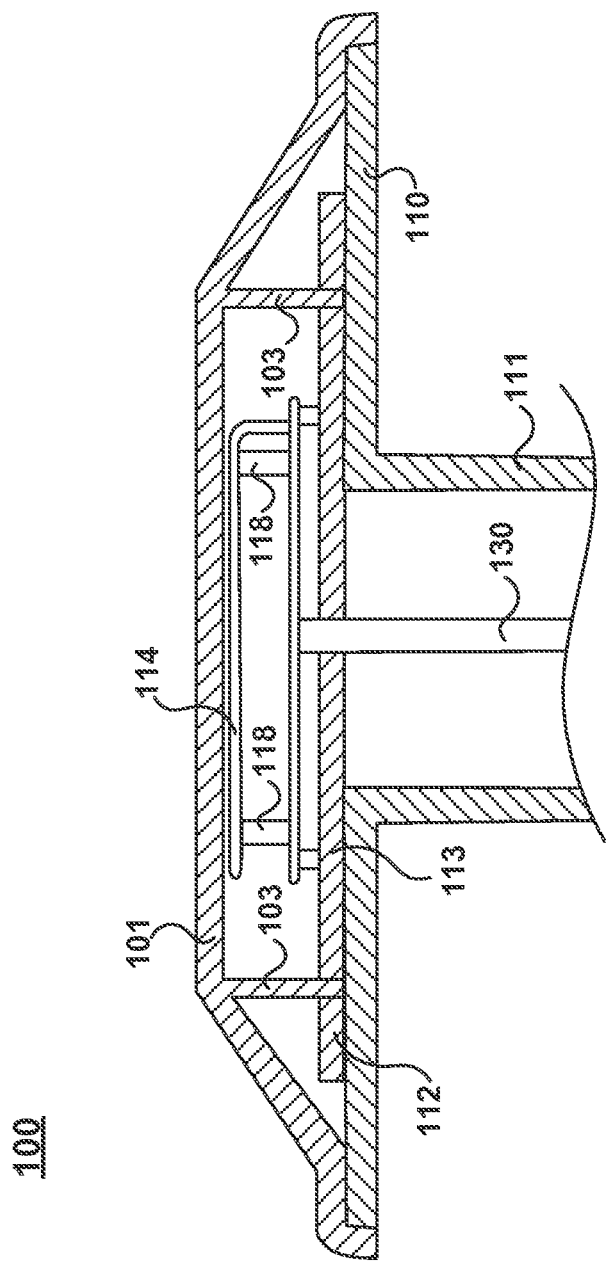
FIG. 2A is a cross section view of a ruggedized electronic enclosure for in-ground installation in accordance with an embodiment.

FIG. 2A is a cross section view of a ruggedized electronic enclosure 100 in accordance with an embodiment. In FIG. 2A, base portion 110 is shown comprising a stem 111 extending from the bottom of base portion 110. In accordance with at least one embodiment, stem 111 is threaded to facilitate attaching ruggedized electronic enclosure 100 to the lid of a pit enclosure of sub-surface meter. After inserting stem 111 into a hole in the top of the lid of the pit enclosure, a threaded nut can be used to engage the threads on stem 111 and secure ruggedized electronic enclosure 100 to the lid of the pit enclosure.

In FIG. 2A, a cable assembly 130 communicatively couples ruggedized electronic enclosure 100 with a transmitter (not shown). It is noted that, in accordance with various embodiments, ruggedized electronic enclosure 100 can be coupled with a transmitter, or transceiver according to its implementation. In FIG. 2A, cable assembly 130 is passed through a hole in ground plane element 112 and is communicatively coupled with an antenna printed circuit board (PCB) 113. In accordance with various embodiments, antenna PCB 113 comprises circuits and circuit elements used for matching the transmission characteristics of ruggedized electronic enclosure 100 with the transmitter with which it is coupled. In accordance with at least one embodiment, ground plane element 112 comprises a plate of 1 mm thickness cold rolled steel with an outside diameter of 160 mm. This is a larger sized ground plane element than is typically found in pit antennas and enhances the performance of ruggedized electronic enclosure 100 when disposed upon a surface such as metal, concrete, wood, etc. Additionally, because ground plane element 112 is not a component of antenna PCB 113, a lower manufacturing cost is incurred.

In FIG. 2A top cover 101 is coupled with base portion 110 and overhangs it at the edges to provide greater protection from moisture, dirt, dust, etc. Top cover 101 further comprises a plurality of legs 103. In accordance with various embodiments, legs 103 extend into holes 104 in ground plane element 112. In at least one embodiment, legs 103 do not normally come into contact with base portion 110. However, when a force is applied onto top cover 101, flexing may occur which will cause legs 103 to come into contact with base portion 110. Additionally, when a force is applied onto top cover 101, it will flex in a manner in which top cover 101 depresses in the middle and causes the bottoms of legs 103 to flex outward in a radial direction toward the outer edges of ruggedized electronic enclosure 100. However, because the bottoms of legs 103 extend into holes 104 of ground plane element 112, they are constrained by the edges of holes 104 from moving outward. As a result, the amount of flexing of top cover 101 which occurs when a force is applied onto it is limited and greater resilience to breakage is exhibited by top cover 101. In another embodiment, legs 103 contact base portion 110 at least when a force is applied to top cover 101 in order to distribute some of the load onto base portion 110. It is noted that other devices can be used to reinforce top cover 101 such as ribs (not shown) disposed on the underside of top cover 101 which will provide more support to resist force applied to top cover 101. In at least one embodiment, top cover 101 is configured to support, for at least a short period, heavy loads. For example, in one embodiment, top cover 101 can support at least 5000 pounds without breaking.

In one embodiment, antenna 114 is separated from antenna PCB 113 by a plurality of spacers 118. In one embodiment, a gap of 8 mm is provided between antenna PCB 113 and antenna 114. However, other size gaps can be created between antenna PCB 113 and antenna 114 by using, for example, other size spacers 118. In one embodiment, antenna 114 comprises a patch antenna. However, other antenna designs can be used as antenna 114 in accordance with various embodiments. In one embodiment, spacers 118 comprise an electrically non-conductive material such as nylon. This not only provides sufficient stiffness to prevent antenna 114 from bending and/or coming into contact with antenna PCB 113, but also does not affect the performance of antenna 114 such as by altering its transmission pattern lobes. Furthermore, in one embodiment, eclectically non-conductive fasteners (e.g., 119 of FIG. 3) are used which also do not affect the performance of antenna 114. In one embodiment, nylon screws are used as fasteners 119. Although not shown in FIG. 2A, in at least one embodiment, fasteners 119 comprise nylon screws, although other electrically non-conductive fasteners can be used in accordance with other embodiments.

Figure 2B:
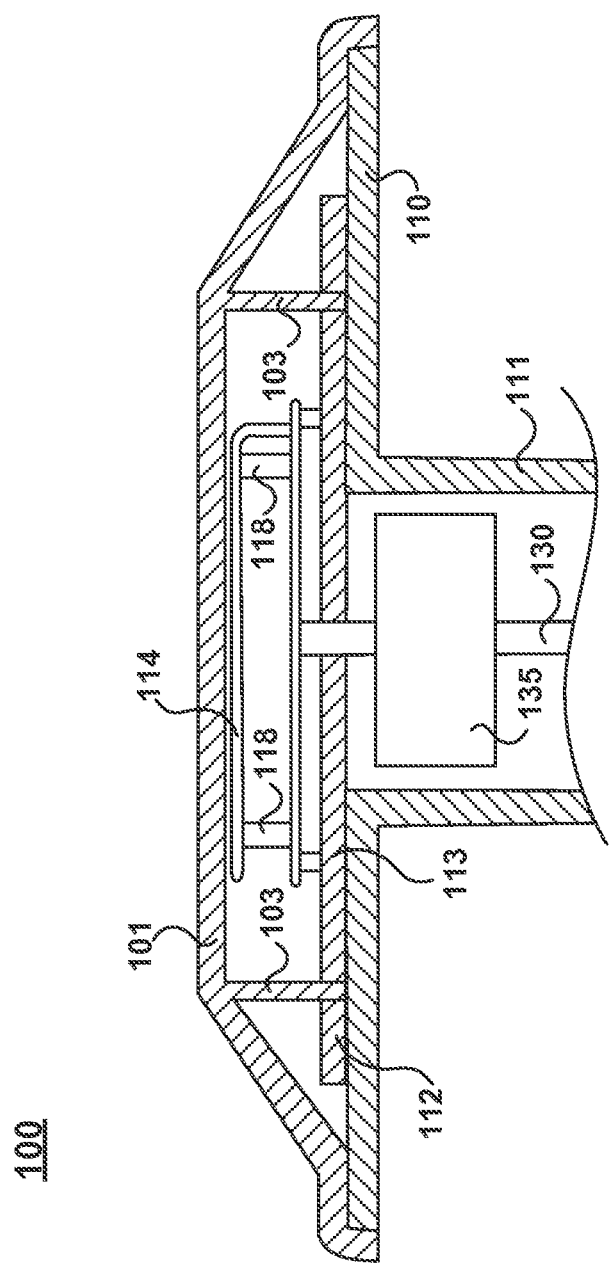
FIG. 2B is a cross section view of a ruggedized electronic enclosure for in-ground installation in accordance with an embodiment.

FIG. 2B is a cross section view of a ruggedized electronic enclosure 100 for in-ground installation in accordance with an embodiment. For the purpose of brevity, the features described above with reference to FIG. 2A will not be repeated in the discussion of FIG. 2B. In the embodiment of FIG. 2B, ruggedized electronic enclosure 100 further comprises an electronic component 135. In one embodiment, electronic component 135 comprises a radio transceiver which operates at the 900 MHz Industrial, Scientific, and Medical (ISM) band which uses the 902-928 MHz frequency range. In one embodiment, electronic component 135 is communicatively coupled with other components outside of ruggedized electronic enclosure 100 via cable assembly 130. In another embodiment, ruggedized electronic enclosure 100 is sealed with cap 105 and comprises a self-contained apparatus. It is noted that electronic component 135 can comprise other components than a radio transceiver alone. For example, electronic component 135 can comprise sensors, computer system components, recording devices, or other communication components in accordance with various embodiments. These other components can be communicatively coupled, via a radio transmitter/transceiver comprising electronic component 135, with communication networks, or directly with a radio receiver/transceiver. Furthermore, while one embodiment utilizes the ISM band for communications, it is noted that various embodiments may utilize other communication standards and protocols including, but not limited to, WiFi network protocols (e.g., compliant with the Institute of Electrical and Electronics Engineers (IEEE) 802.11 standards), the RuBee specification for wireless personal area networks (e.g., compliant with the IEEE 1902 standard), the Bluetooth wireless standard (e.g., compliant with the IEEE 802.15 standard), the IEEE 802.15.1 standard for personal area networks, the ZigBee specification for wireless personal area networks (e.g., compliant with the IEEE 802.15.4 standard), as well as other devices compliant with other implementations of the IEEE 802.15 standards for wireless personal area networks.

Figure 3:
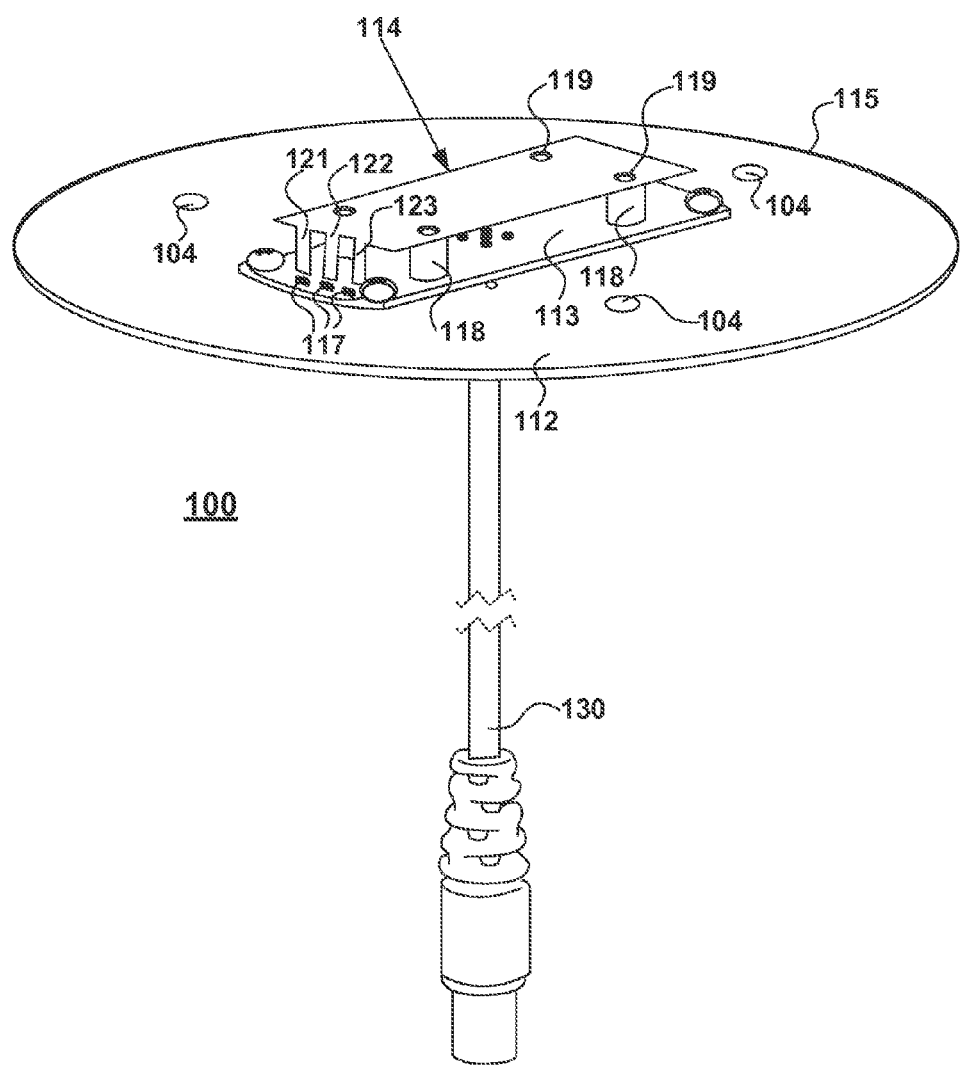
FIG. 3 is a perspective view showing components of a ruggedized electronic enclosure for in-ground installation in accordance with an embodiment.

FIG. 3 is a perspective view showing components of a pit antenna assembly in accordance with an embodiment. In FIG. 3, ground plane element 112 is shown upon which antenna PCB 113 and antenna 114 are disposed. In FIG. 3, ground plane element 112 comprises a notch 115 which fits around a corresponding pole (not shown) of base portion 110. Again, it is noted that ruggedized electronic enclosure 100 is assembled such that the alignment of antenna 114 can be discerned when top cover 101 is coupled with base portion 110. By aligning notch 115 with a corresponding pole of base portion 110, the alignment of antenna 114 relative to base portion 110 can be known. Then, when top cover 101 is coupled with base portion 110, location posts (not shown) of base portion 110 fit into corresponding holes of top cover 101. As a result, the alignment of top cover 101 relative to base portion 110 can be known. Thus, as discussed above, top cover 101 comprises alignment indicator 102 which conveys the alignment of antenna 114 when top cover 101 is coupled with base portion 110. In one embodiment, when top cover 101 is coupled with base portion 110, notch 115 and alignment indicator 102 are superimposed in alignment with one another such that alignment indicator 102 presents an external indication of the position of notch 115 within ruggedized electronic enclosure 100.

In FIG. 3, holes 104 are shown into which legs 103 of top cover 101 are inserted when top cover 101 is coupled with base portion 110. Also shown in FIG. 3 is a plurality of electrical contacts which couple antenna 114 with antenna PCB 113. In FIG. 3, a left electrical contact 121, a center electrical contact 122, and a right electrical contact 123 are shown. In one embodiment, center electrical contact 122 conveys electrical signals from antenna PCB 113 to antenna 114. Left electrical contact 121 and right electrical contact 123 are electrically coupled with ground plane element 112 via antenna PCB 113. In accordance with various embodiments, the use of left electrical contact 121 and right electrical contact 123 balance the radiation pattern of antenna 114 and make its radiation pattern more symmetric. Also shown in FIG. 3 are solder patches 117 which are disposed upon antenna PCB 113. In accordance with various embodiments, solder patches 117 facilitate coupling electrical circuit elements, also known as "tuning elements" or "tuning stubs", onto antenna PCB 113 to adjust the impedance matching between antenna 114 and a radio transmitter/transceiver (not shown) to which it is coupled. For example, additional circuit elements can be coupled to antenna PCB 113 using solder patches 117 such that the impedance between antenna 114 and the radio transmitter/transceiver, with which it is coupled, can be matched. This improves the transmission and reception characteristics of antenna 114. As one non-limiting example, additional circuit elements can be added to antenna PCB 113 to provide 50 Ohms impedance matching between antenna 114 and the radio transmitter/transceiver with which it is coupled. However, other values of impedance matching such as 75 Ohms or 300 Ohms are well known in the art and can be provided by coupling the proper tuning elements with solder patches 117.

Figure 4:
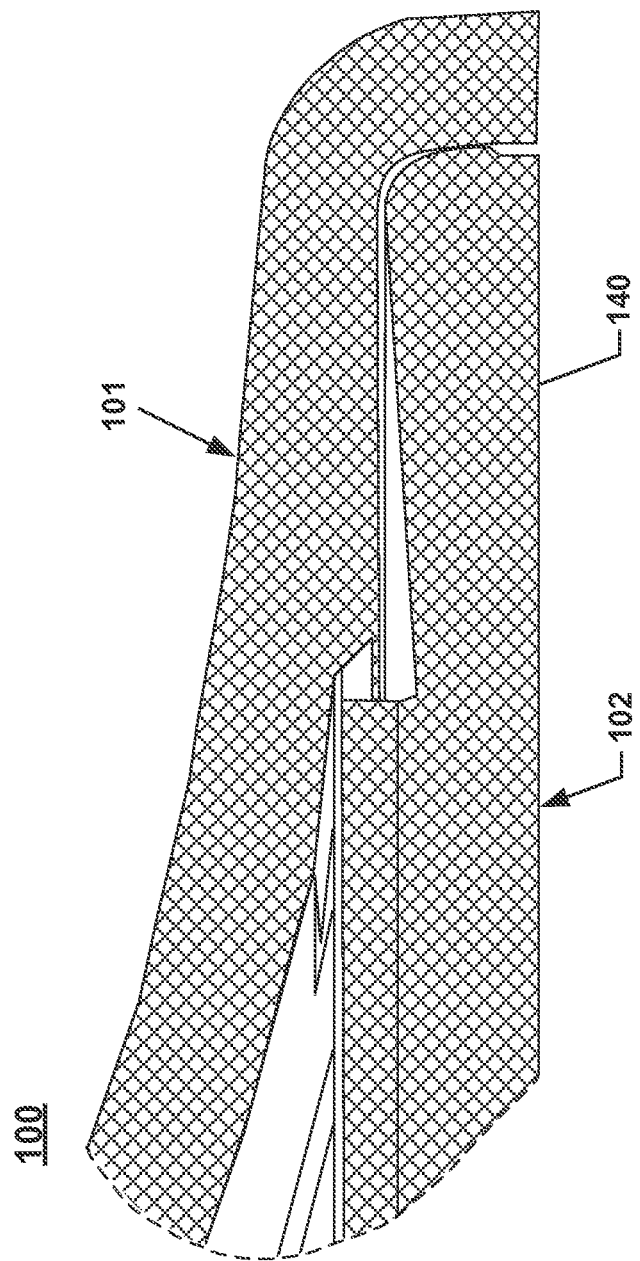
FIG. 4 is a view of an antenna of a ruggedized electronic enclosure for in-ground installation in accordance with an embodiment.

FIG. 4 is a view of a ruggedized electronic enclosure 100 in accordance with an embodiment. In FIG. 4, the edge of ruggedized electronic enclosure 100 where top cover 101 overhangs base portion 110 is shown. Again, top cover 101 overhangs base portion 110 in various embodiments to provide protection from moisture, dirt, and dust to the electrical components of ruggedized electronic enclosure 100. As shown in FIG. 4, base portion 110 and/or top cover 101 are configured to form a channel 140 when they are coupled. In at least one embodiment, channel 140 is configured such that it is wider at the end which is proximate the center of ruggedized electronic enclosure 100 and narrower at the end which is proximate the outer edge of ruggedized electronic enclosure 100. In accordance with an embodiment, top cover 101 and base portion 110 can be snap-fit together. In another embodiment, an adhesive can be used to join top cover 101 and base portion 110 in a more permanent manner. This also provides a greater degree of protection from moisture, dirt, and dust to the electrical components of ruggedized electronic enclosure 100. In accordance with at least one embodiment, when channel 140 is configured such that it is wider at the end which is proximate to the center of ruggedized electronic enclosure 100, excess adhesive will be conveyed toward the wider end of channel 140 (e.g., toward the interior of enclosure 100). As a result, less excess adhesive or "glue fingers" will ooze out from ruggedized electronic enclosure 100 when top cover 101 is joined with base portion 110. Consequently, there is less need for a separate step in which excess adhesive is trimmed from ruggedized electronic enclosure 100 which saves time and money during its manufacture. In one embodiment, cap 105 of FIG. 2B and stem 111 of base portion 110 can be configured as shown in FIG. 4 as well. Thus, for example, the portion of cap 105 which comes into contact with stem 105 can be configured in a manner similar to top cover 101 as shown in FIG. 4. Similarly, the portion of stem 111 which comes into contact with cap 105 can configured in a manner similar to base portion 110 as shown in FIG. 4 (e.g., with a respective channel 140). Thus, when an adhesive is used when coupling cap 105 and stem 111, excess adhesive will be conveyed toward the wider end to channel 140 (e.g., toward the interior of stem 111).

Embodiments of the present technology are thus described. While the present technology has been described in particular embodiments, it should be appreciated that the present technology should not be construed as limited to these embodiments alone, but rather construed according to the following claims.

What is claimed is:

1. A ruggedized electronic enclosure for in-ground installation comprising:
 a top cover configured to be at least partially exposed above a top surface of the ground, the top cover including a concave portion and an outer edge, wherein the outer edge extends circumferentially around the concave portion;
 a base portion configured to be at least partially embedded within the ground, the base portion including a bottom portion that is cylindrical and a top portion that extends radially outward from a top end of the bottom portion, the top portion being substantially planar, wherein the outer edge of the top cover and the top portion of the base portion are configured to be coupled with each other such that the top cover overlaps the base portion and creates a channel conveying an adhesive for joining the top cover with the base portion;
 a ground plane element disposed within the ruggedized enclosure and comprising an electrically conductive material; and
 a plurality of legs extending from the concave portion of the top cover into corresponding holes in the ground plane element;
 wherein the channel is wider at an end that is proximate to a center of the ruggedized electronic enclosure and is narrower at an end that is distant from the center of the ruggedized electronic enclosure such that excess adhesive is conveyed toward the center of the ruggedized electronic enclosure.

2. The ruggedized electronic enclosure of claim 1 further comprising:
 a cap coupled with an end of the bottom portion of the base portion.

3. The ruggedized electronic enclosure of claim 2 wherein:
 the base portion is configured such that a vertically polarized omni-directional antenna may be disposed therein in a known orientation; and
 the top cover includes an indicator which indicates the known orientation when coupled with the base portion.

4. A pit antenna assembly comprising:
 a ruggedized enclosure comprising a base portion configured to be at least partially embedded within the ground and a top cover configured to be at least partially exposed above a top surface of the ground, wherein:
  the top cover includes a concave portion and an outer edge, wherein the outer edge extends circumferentially around the concave portion;
  the base portion includes a bottom portion that is cylindrical and a top portion that extends radially outward from a top end of the bottom portion, the top portion being substantially planar; and
  the outer edge of the top cover and the top portion of the base portion are configured to be coupled with each other such that the top cover overlaps the base portion and creates a channel conveying an adhesive for joining the top cover with the base portion;
  wherein the channel is wider at an end that is proximate to a center of the ruggedized enclosure and is narrower at an end that is distant from the center of the ruggedized enclosure such that excess adhesive is conveyed toward the center of the ruggedized enclosure;
 a ground plane element disposed within the ruggedized enclosure and comprising an electrically conductive material;
 a plurality of legs extending from the concave portion of the top cover into corresponding holes in the ground plane element;
 a printed circuit board disposed within the ruggedized enclosure coupled with the ground plane element; and
 an antenna disposed within the ruggedized enclosure which is communicatively coupled with the ground plane element via the printed circuit board.

5. The pit antenna assembly of claim 4 wherein the antenna is disposed within the base portion with a known orientation and wherein the top cover indicates the known orientation.

6. The pit antenna assembly of claim 4 further comprising:
 a cap coupled with an end of the bottom portion of the base portion.

7. The pit antenna assembly of claim 4 further comprising:
 at least one electronic component disposed within the base portion.

8. The pit antenna assembly of claim 4 wherein the antenna is mechanically coupled via the printed circuit board to the ground plane element using at least one non-electrically conductive fastener.

9. The pit antenna assembly of claim 4 wherein the antenna is separated from the printed circuit board using at least one non-electrically conductive spacer.

10. A pit antenna assembly comprising:
 a ruggedized enclosure comprising a base portion configured to be at least partially embedded within the ground and a top cover configured to be at least partially exposed above a top surface of the ground, wherein:
  the top cover includes a concave portion and an outer edge, wherein the outer edge extends circumferentially around the concave portion;
  the base portion includes a bottom portion that is cylindrical and a top portion that extends radially outward from a top end of the bottom portion, the top portion being substantially planar; and
  the outer edge of the top cover and the top portion of the base portion are configured to be coupled with each other such that the top cover overlaps the base portion and creates a channel conveying an adhesive for joining the top cover with the base portion;

wherein the channel is wider at an end that is proximate to a center of the ruggedized enclosure and is narrower at an end that is distant from the center of the ruggedized enclosure such that excess adhesive is conveyed toward the center of the ruggedized enclosure;

a ground plane element disposed within the ruggedized enclosure and comprising an electrically conductive material;

a plurality of legs extending from the concave portion of the top cover into corresponding holes in the ground plane element;

a printed circuit board disposed within the ruggedized enclosure and coupled with the ground plane element; and a vertically polarized omni-directional antenna disposed within the ruggedized enclosure and communicatively coupled with the printed circuit board and with the ground plane element via the printed circuit board.

11. The pit antenna assembly of claim 10 wherein the antenna is disposed within the base portion with a known orientation and wherein the top cover indicates the known orientation.

12. The pit antenna assembly of claim 10 wherein the antenna is mechanically coupled via the printed circuit board to the ground plane element using at least one non-electrically conductive fastener.

13. The pit antenna assembly of claim 10 wherein the antenna is separated from the printed circuit board using at least one non-electrically conductive spacer.

14. The pit antenna assembly of claim 10 further comprising:

a cap coupled with an end of the bottom portion of the base portion.

15. The pit antenna assembly of claim 14 further comprising:

at least one electronic component disposed within the base portion.

* * * * *